(12) United States Patent
Woo et al.

(10) Patent No.: US 9,467,056 B2
(45) Date of Patent: Oct. 11, 2016

(54) POWER SUPPLYING APPARATUS AND METHOD FOR SUPPLYING POWER TO THE VARYING LOAD

(71) Applicant: SAMSUNG ELECTRONICS CO., LTD., Suwon-si (KR)

(72) Inventors: Won-myung Woo, Seoul (KR); Jin-hyung Lee, Anyang-si (KR); Seung-myen Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 14/286,368

(22) Filed: May 23, 2014

(65) Prior Publication Data

US 2015/0131331 A1 May 14, 2015

(30) Foreign Application Priority Data

Nov. 11, 2013 (KR) .......................... 10-2013-0136397

(51) Int. Cl.
*H02M 3/335* (2006.01)
*H02M 1/00* (2006.01)

(52) U.S. Cl.
CPC . *H02M 3/33523* (2013.01); *H02M 2001/0009* (2013.01); *H02M 2001/0019* (2013.01)

(58) Field of Classification Search
CPC .............. H02M 2001/0009; H02M 2001/019; H02M 2001/0025
See application file for complete search history.

(56) References Cited

U.S. PATENT DOCUMENTS

| 5,414,611 A * | 5/1995 | Muto ...................... H02J 7/022 363/21.15 |
| 7,239,532 B1 * | 7/2007 | Hsu .................... H02M 3/33523 363/21.12 |
| 8,125,800 B2 * | 2/2012 | Forghani-zadeh ...... H02M 1/36 323/287 |
| 8,198,874 B2 * | 6/2012 | Melanson ............. H02M 3/156 323/222 |
| 8,665,010 B2 * | 3/2014 | Lin ................... H02M 3/33507 327/551 |
| 8,902,614 B2 * | 12/2014 | Basso ............... H02M 3/33523 363/21.12 |

(Continued)

FOREIGN PATENT DOCUMENTS

| KR | 10-1993-0005216 B1 | 6/1993 |
| KR | 10-2011-0050094 A | 5/2011 |

*Primary Examiner* — Timothy J Dole
*Assistant Examiner* — Yusef Ahmed
(74) *Attorney, Agent, or Firm* — Sughrue Mion, PLLC

(57) ABSTRACT

Disclosed is an apparatus for supplying power to a device. The apparatus includes a transformer configured to output a predetermined voltage to a device varying in load; a switch configured to switch on and off the voltage output from the transformer in accordance with pulse width modulation (PWM) signals; a PWM signal supplier configured to supply the PWM signal to the switch; a feedback circuit which detects the output from the transformer and applies a control signal to the PWM signal supplier; and an output voltage controller which detects a load current of the device, and adjusts the control signal of the feedback circuit by adjusting the output detected by the feedback circuit in accordance with the detected load current.

16 Claims, 13 Drawing Sheets

(56) References Cited

U.S. PATENT DOCUMENTS

| Publication No. | Date | Inventor | Classification | Subclass |
|---|---|---|---|---|
| 2006/0066264 A1* | 3/2006 | Ishigaki | H05B 41/282 | 315/291 |
| 2006/0114698 A1* | 6/2006 | Hatakeyama | H02M 3/33523 | 363/20 |
| 2010/0321957 A1* | 12/2010 | Sha | H02M 3/33507 | 363/20 |
| 2011/0199796 A1* | 8/2011 | Wu | H02M 3/33523 | 363/21.17 |
| 2012/0050250 A1* | 3/2012 | Jung | H05B 33/0815 | 345/212 |
| 2012/0147631 A1* | 6/2012 | Nate | H02M 3/33507 | 363/21.15 |
| 2012/0194162 A1* | 8/2012 | Lin | H02M 1/14 | 323/304 |
| 2012/0195075 A1* | 8/2012 | Nate | H02M 3/33553 | 363/21.01 |
| 2012/0249005 A1* | 10/2012 | Jin | H05B 33/0818 | 315/206 |
| 2013/0002746 A1* | 1/2013 | Takayanagi | B41J 29/38 | 347/14 |
| 2013/0063987 A1* | 3/2013 | Boku | H02M 3/335 | 363/21.17 |
| 2013/0236203 A1* | 9/2013 | Nakajima | H02M 3/33507 | 399/88 |
| 2013/0236204 A1* | 9/2013 | Yamaguchi | H02M 3/33507 | 399/88 |
| 2014/0133193 A1* | 5/2014 | Tzeng | H02M 3/33523 | 363/21.15 |
| 2014/0140107 A1* | 5/2014 | Chen | H02M 3/33523 | 363/21.15 |
| 2014/0293360 A1* | 10/2014 | Inukai | G03G 15/5004 | 358/302 |
| 2014/0321167 A1* | 10/2014 | Klein | H02M 3/33507 | 363/16 |
| 2015/0029762 A1* | 1/2015 | Lu | H02M 3/33523 | 363/21.17 |
| 2015/0188442 A1* | 7/2015 | Kesterson | H02M 3/33523 | 363/21.15 |
| 2015/0349651 A1* | 12/2015 | Morota | H02M 3/33523 | 363/21.15 |

\* cited by examiner

POWER SUPPLYING APPARATUS AND METHOD FOR SUPPLYING POWER TO THE VARYING LOAD

CROSS-REFERENCE TO RELATED APPLICATION

This application claims priority from Korean Patent Application No. 10-2013-0136397, filed on Nov. 11, 2013 in the Korean Intellectual Property Office, the disclosure of which is incorporated herein by reference, in its entirety.

BACKGROUND

1. Technical Field

Apparatuses and methods consistent with the exemplary embodiments relate to an apparatus and method for supplying power. More particularly, the exemplary embodiments relate to an apparatus and method for supplying power, in which parts of the power supply device are protected and performance of an audio system which varies in load is not deteriorated, even though the audio system is overloaded.

2. Description of the Related Art

A general power supply for an audio system outputs a constant voltage regardless of a load. Thus, under a peak load condition of the audio system, the power supply becomes overloaded several times higher than rated power. If such a condition lasts, heat generated in parts of the power supply for the audio system becomes serious, thereby causing a defect, resulting in product liability (PL).

FIG. 1 shows a related art flyback type power supply 10 of an audio system. As shown in FIG. 1, when alternating current (AC) power is applied via a bridge rectifier circuit 11, a switching element MOSFET SW1 starts a switching operation by a start-up circuit of a pulse width modulation (PWM) integrated circuit (IC) 12, and therefore the switching operation causes a primary transformer 13 and a secondary transformer 14 to apply a voltage VCC, thereby normally operating the PWM IC 12. A secondary output voltage of the primary transformer 13 is supplied as a signal to the PWM IC 12 through a feedback circuit 15 which includes a shunt regulator, an output dividing resistor R2 and a photo-coupler, thereby controlling the switching element SW1 to switch on/off. The output Vamp of the primary transformer 13 is started as above, and this output undergoes regulation through feedback control. The regulation for the output voltage through the feedback control is performed as follows.

In response a voltage applied to both ends of the output dividing resistor R2 being higher than a reference voltage Ref of the shunt regulator, the shunt regulator is turned on and electric current flows in a primary side of the photo-coupler. In result, a signal is transmitted even to a secondary side of the photo-coupler, and therefore the electric current flows in the secondary side, thereby varying a switching duty of the PWM IC 12.

Referring to FIG. 2, the power supply 10 is regulated to maintain a constant voltage (CV) through the feedback control even though the load current increases or decreases. Also, a protection circuit may be designed to operate to shut down (i.e., protect) the output voltage when the load continuously increases and reaches an overload state.

For example, in the case of the power supply for the audio system, maximum peak power has to be properly supplied with regard to peak music power output (PMPO). Since the output voltage is constantly supplied with regard to even a sound source of which the peak music power output is continued, it is possible to continuously supply power several times higher than rated output. As a result, abnormal power higher than the rated output is continuously output, and therefore semiconductor and magnetic parts in the power supply 10 are overheated and cause a serious problem of a defect resulting in product liability (PL).

To cope with the peak output of such an audio system, the capacities of a transformer and an input/output electrolytic capacitor may be designed to be overspecialized, but this causes a problem of rise in price.

SUMMARY

One or more exemplary embodiments may provide a device and method of supplying power, in which not only maximum peak power is properly supplied with regard to a peak music power output (PMPO) but also overheating of the power supply is prevented even when a peak output condition continues.

According to an aspect of one exemplary embodiment, there is provided an apparatus for supplying power, the apparatus including, a transformer configured to output a predetermined voltage to a device varying in load; a switch configured to switch on and off the voltage output from the transformer in accordance with pulse width modulation (PWM) signals; a PWM signal supplier configured to supply the PWM signal to the switch; a feedback circuit configured to detect the output from the transformer and applies a control signal to the PWM signal supplier; and an output voltage controller configured to detect a load current of the device, and adjusts the control signal of the feedback circuit by adjusting the output detected by the feedback circuit in accordance with the detected load current.

The transformer may include at least one of a flyback type transformer, an LLC resonance type transformer, a forward type, a push-pull type transformer and a half bridge type transformer.

The output voltage controller may include a shunt resistor configured to detect the load current.

The shunt resistor may be connected between a load and the output of the transformer in order to detect a high side current.

The shunt resistor may be connected between a ground (GND) and the output of the transformer in order to detect a low side current.

The output voltage controller may include a current detector which detects a current flowing in the shunt resistor in order to detect the load current; a PWM signal generator configured to generate the PWM signal in accordance with the detected current; and an output voltage adjuster configured to adjust the output detected by the feedback circuit in accordance with the PWM signal output from the PWM signal generator.

The output voltage adjuster may be configured to decrease an output voltage of the transformer as the load current increases.

The current detector may include a differential amplifier (OP-AMP).

The PWM signal generator may be configured to generate a shut-down signal for shutting the PWM signal supplier down in response to the load current exceeding a predetermined value.

The feedback circuit may include a shunt regulator and a first resistor connected in parallel between the ground and the output of the transformer, and the output voltage adjuster may include a second resistor connected in parallel with the first resistor, and a second switch connected in series with the second resistor and switching on/off in accordance with the PWM signal generated by the PWM signal generator.

According to an aspect of another exemplary embodiment, there is provided a method of supplying power, the method including, outputting a predetermined voltage to a device varying in load, by switching on/off in accordance with a pulse width modulation (PWM) signal; and adjusting the PWM signal by detecting the output, the PWM signal being varied depending on a detected load current of the device.

The output of the predetermined voltage may be performed by at least one of a flyback type transformer, an LLC resonance type transformer, a forward type transformer, a push-pull type transformer and a half bridge type of transformer.

The detection of the load current may be performed by a shunt resistor.

The shunt resistor may be connected between a load and the output of the transformer in order to detect a high side current.

The shunt resistor may be connected between a ground (GND) and the output of the transformer in order to detect a low side current.

The variance of the PWM signal may include, detecting a current flowing in the shunt resistor in order to detect the load current; generating the PWM signal in accordance with the detected current; and adjusting the detected output in accordance with the generated PWM signal.

The adjustment of the output may include decreasing the output voltage as the load current increases.

The detection of the load current may be performed by a differential amplifier (OP-AMP).

The method may further include shutting the PWM signal supplier down when the load current exceeds a predetermined value.

An aspect of an exemplary embodiment may provide an apparatus for supplying power to a device varying in load, the apparatus including: a switch configured to switch on and off a voltage output in accordance with pulse width modulation (PWM) signals; a PWM signal supplier configured to supply the PWM signal to the switch; a feedback circuit configured to apply a control signal to the PWM signal supplier; and an output voltage controller configured to detect a load current of the device, and adjust the control signal of the feedback circuit in accordance with the detected load current.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF THE EXEMPLARY EMBODIMENTS

Below, exemplary embodiments will be described in detail with reference to the accompanying drawings. The following exemplary embodiments only describe configurations directly related to the inventive concept, and the descriptions of other configurations will be omitted. However, it will be understood that the omitted configurations are not unnecessary in complementing an apparatus or system to which the exemplary embodiments are applied. Further, like numerals refer to like elements throughout.

A power supply 10 according to an exemplary embodiment may be applied to various electronic devices such as an audio system, a television (TV), a computer system, etc. which are varied in load. Below, an audio system 300 will be described as an example, but the exemplary embodiments are not limited thereto.

Figure 1:
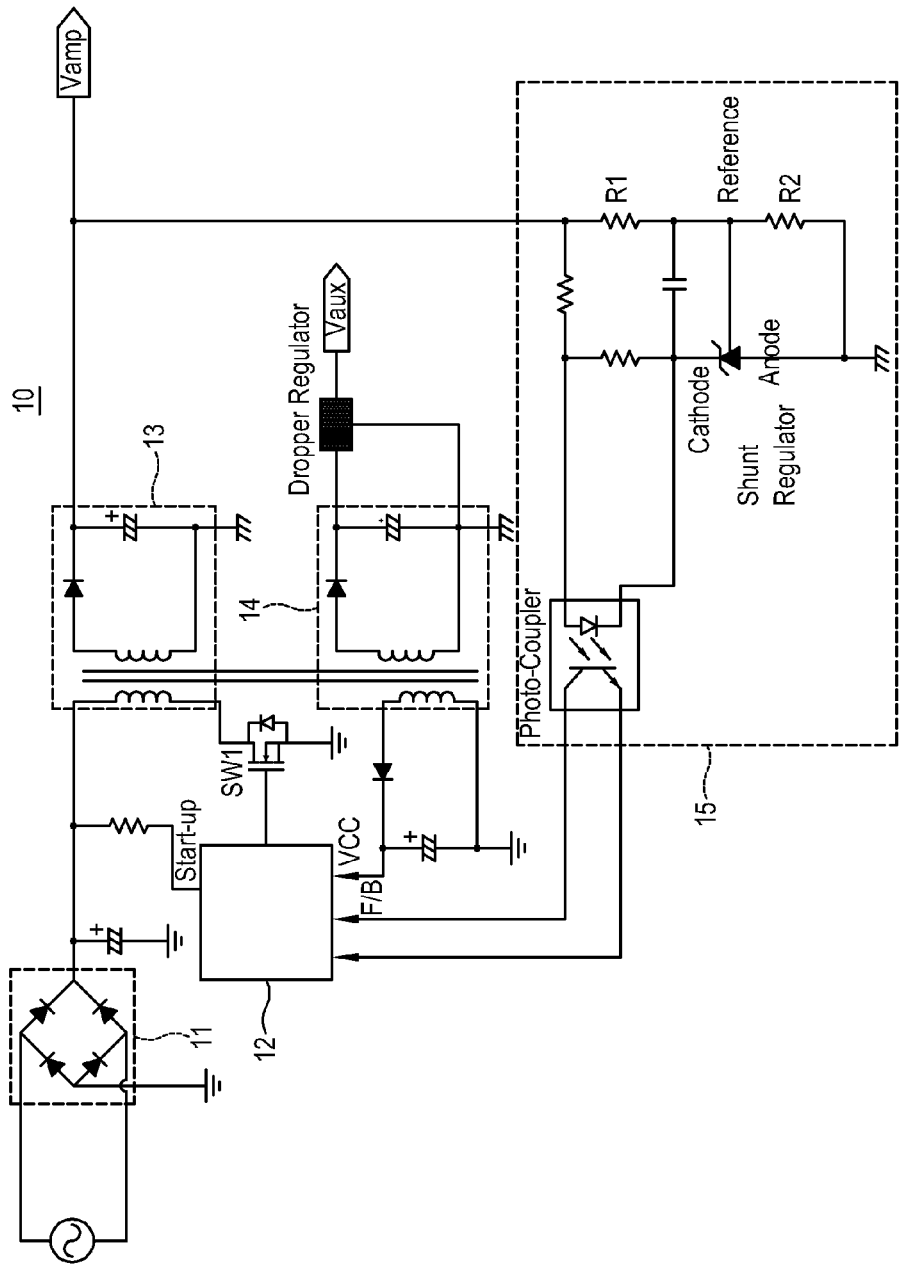
FIG. 1 is a circuit diagram showing a power supply if the related art.
Figure 2:
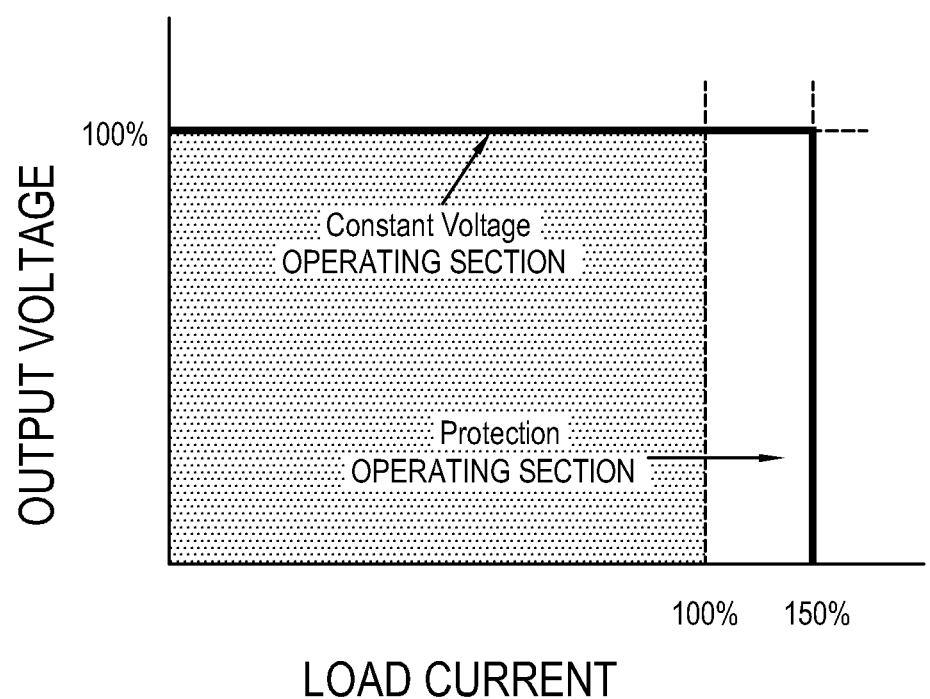
FIG. 2 is a view showing a relationship between a load current and an output voltage in the power supply of the related art.
Figure 3:
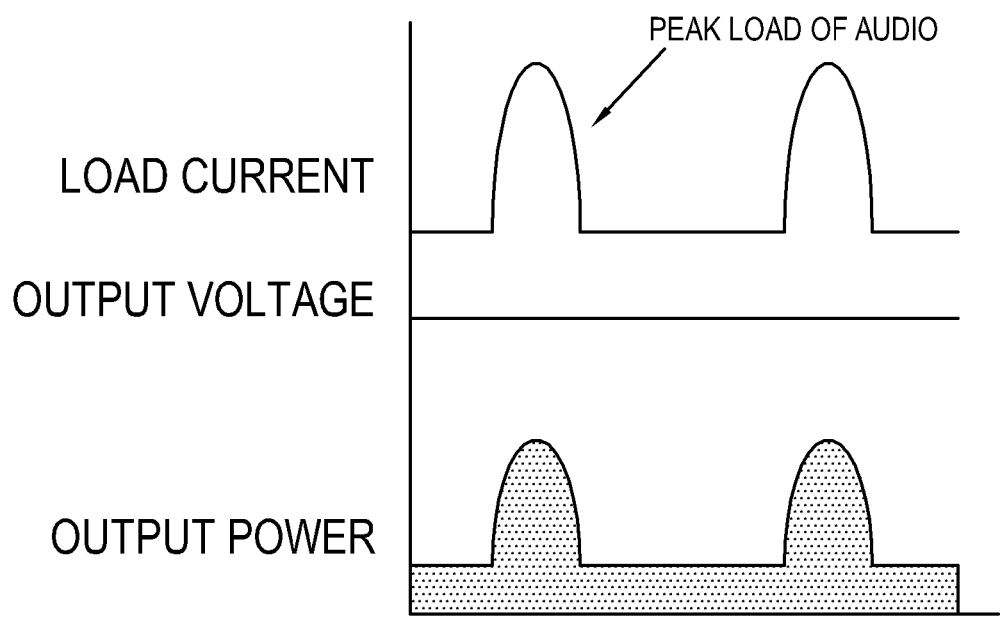
FIG. 3 is a view showing comparison between the voltage and power output from a transformer in accordance with the load current of the power supply of the related art.
Figure 4:
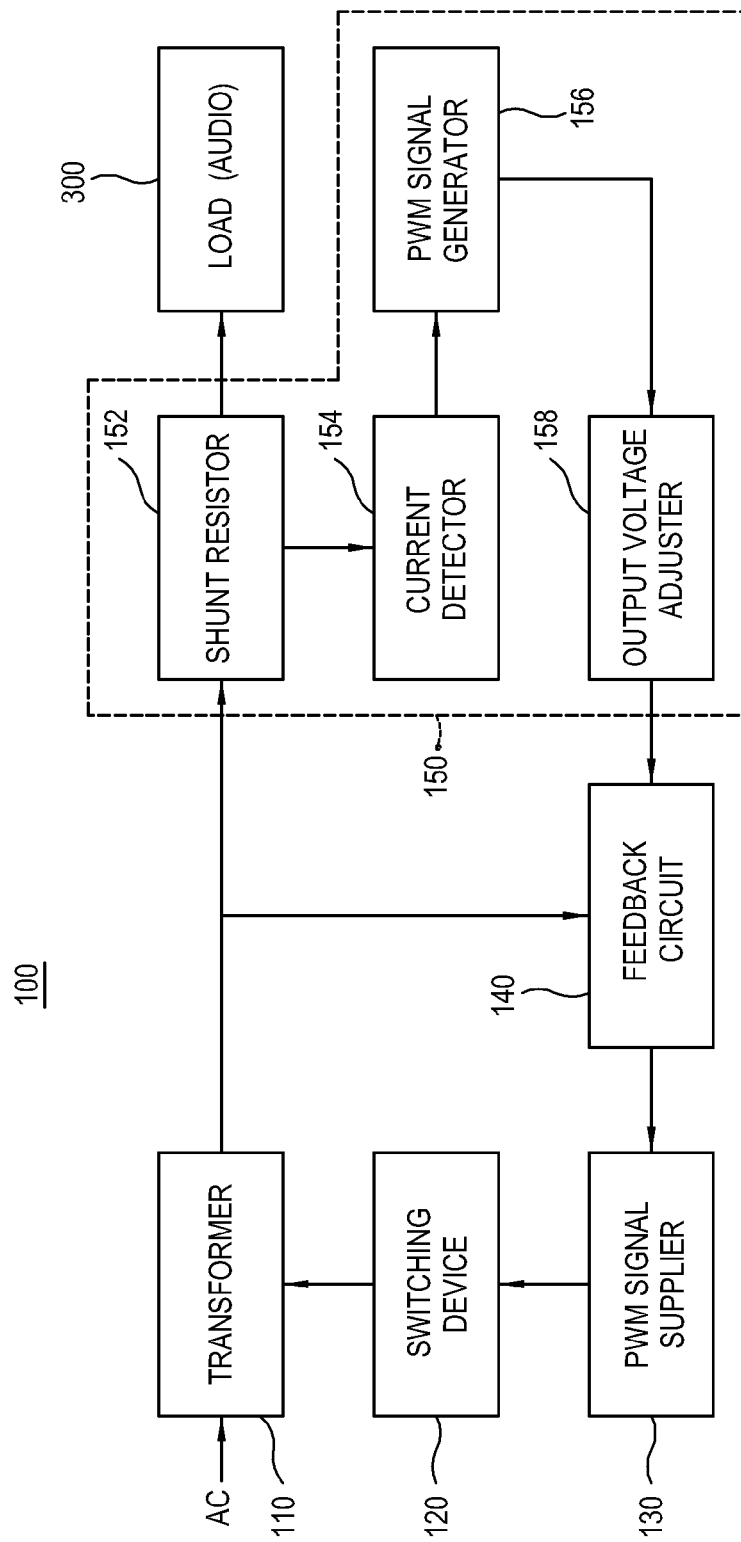
FIG. 4 is a block diagram of a power supply according to an exemplary embodiment.

FIG. 4 is a block diagram of a power supply 100 according to an exemplary embodiment. As shown in FIG. 4, the power supply 100 includes a transformer 110 which receives alternating current (AC) power and transforms it; a switching device 120 which switches on/off the transformer 110; a pulse width modulation (PWM) signal supplier 130 which supplies a PWM signal to the switching device 120; a feedback circuit which controls the PWM signal supplier 130 by feeding back the output of the transformer 110; and an output voltage controller 150 which detects a load current of an audio system supplying the output of the transformer 110 and controls the feedback circuit 140.

The transformer 110 generates induced electromotive force to a secondary side by switching on/off a voltage signal applied to a primary side, and transforms the induced electromotive force into a driving voltage needed for an audio system (i.e., a load) 300, thereby outputting the driving voltage.

Figure 5:
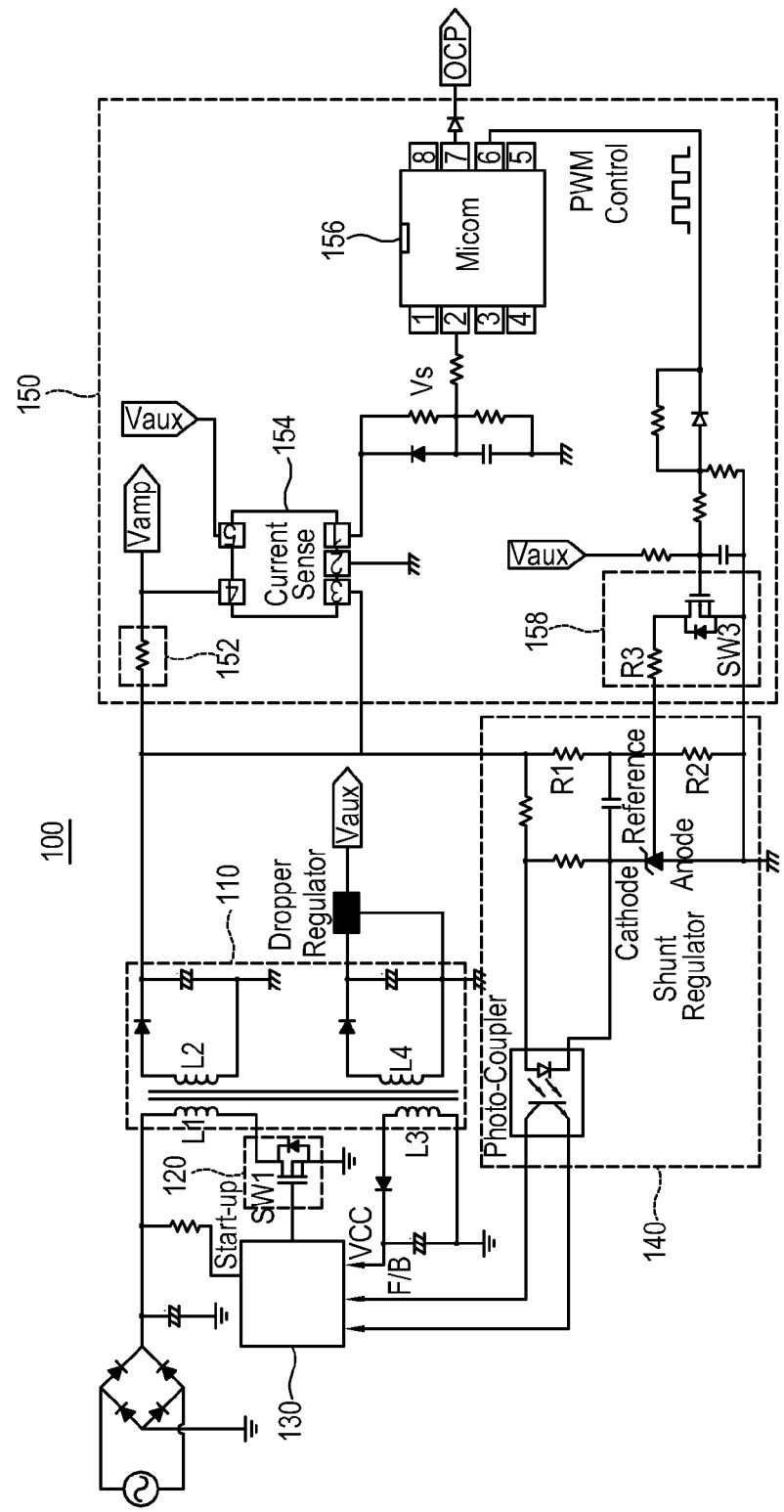
FIG. 5 is a circuit diagram of the power supply according to an exemplary embodiment.
Figure 6:
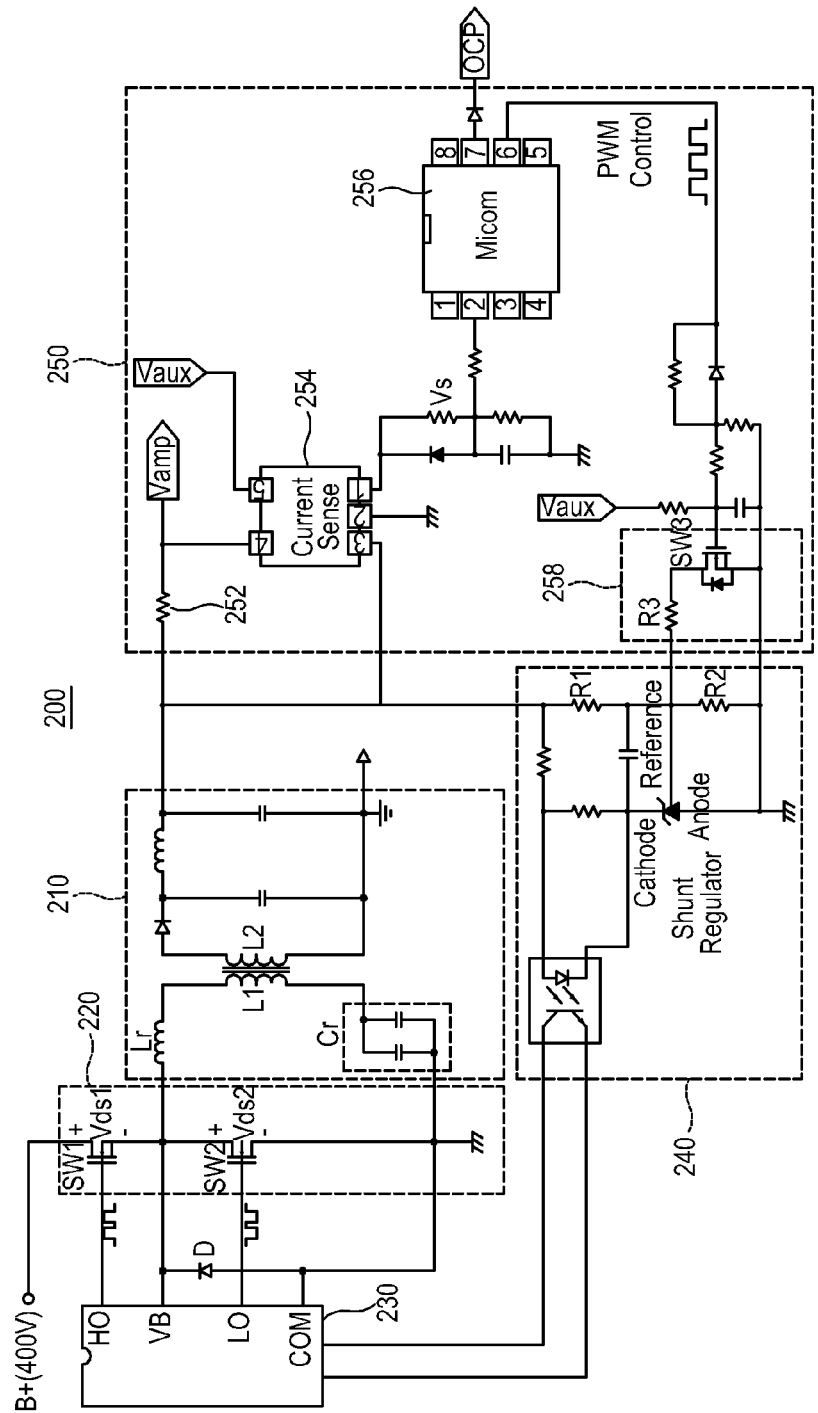
FIG. 6 is a circuit diagram of a power supply according to another exemplary embodiment.

The transformer 110 may be of a flyback type as shown in FIG. 5, or may be of an inductor-inductor-capacitor (LLC) resonance type as shown in FIG. 6. Of course, the transformer 110 may include various transformers of a forward type, a push-pull type, a half bridge type, etc. as well as the flyback type and the LLC resonance type.

The switching device 120 may control the transformer 110 to be turned on and off in accordance with the PWM signal. The switching device 120 may include a semiconductor switching device such as metal oxide semiconductor field effect transistor (MOSFET).

The PWM signal supplier 130 may supply the PWM signal for controlling the switching device 120. The PWM signal supplier 130 may include, for example, a power control IC (e.g., PWM IC).

The feedback circuit 140 detects the voltage output from the transformer 110 to the audio system, and regulates the output voltage of the transformer 110. The feedback circuit 140 may include for example a shunt regulator, an output dividing resistor R2, and a photo-coupler as shown in FIG.

5. In response to a voltage applied between both ends of the output dividing resistor R2 being higher than a reference voltage Ref of the shunt regulator, the shunt regulator is turned on and electric current flows in a primary side of the photo-coupler. As a result, a signal is transmitted to a secondary side of the photo-coupler, and therefore the electric current flows in the secondary side, thereby varying a switching duty of the PWM signal supplier 130.

The output voltage controller 150 detects a current of the load (i.e., audio system) and applies PWM control to the feedback circuit 140, thereby controlling the output voltage of the transformer 110 in accordance with the detected load currents.

The output voltage controller 150 may include a shunt resistor 152 provided in the output of the transformer 110, a current detector 154 for detecting a current flowing in the shunt resistor 152, a PWM signal generator 156 receiving the detected current and generating the PWM signal, and an output voltage adjuster 158 adjusting the output voltage of the transformer 110 in accordance with the PWM signal output from the PWM signal generator 156.

The shunt resistor 152 may be connected between the load (i.e., the audio system) and the output of the transformer in order to detect the load current. The shunt resistor may be connected to a high side as shown in FIG. 5. Although it is not shown, the shut resistor may be connected to a low side between a ground and the secondary output of the transformer 110. In response to the shunt resistor 152 being connected to the low side, it is possible to use a relatively low resistor and thus reduce power consumption due to heat emission.

The current detector 154 can detect the load current, which flows in the shunt resistor 152, in real time. The current detector 154 outputs a voltage Vs to the PWM signal generator 156 in accordance with the detected load currents. The current detector 154 may be achieved by a packaged IC or a differential amplifier (e.g., an OP-AMP).

The PWM signal generator 156 outputs a PWM duty signal varied depending on the voltage Vs output from the current detector 154 and supplies it to the output voltage adjuster 158. For example, in response to the voltage Vs being equal to or lower than 2.5V, the PWM duty is maintained at 45%. On the other hand, in response to the voltage Vs being higher than 2.5V, the PWM duty is reduced. That is, if the voltage Vs increases from 2.5V to 4.0V, the PWM duty is reduced from 45% to 0%. At this time, the increase in the voltage Vs refers to the increase in the load current.

The PWM signal generator 156 may shut down the PWM signal supplier 130 in an overload case where, the current flowing in the shunt resistor 152 is beyond a predetermined range. For example, in the state that the PWM duty is 0% and the transformer 110 outputs 12.8V, in response to the load current continuously increasing and reaching a limit value, the PWM signal generator 156 may output a fault signal. For example, a switching element (not shown) is provided in a tertiary winding-wire output line L3 of the transformer 110 supplying a voltage Vcc to the PWM signal supplier 130, and a fault signal for turning off the corresponding switching element is applied to shut down the PWM signal supplier 130. The PWM signal generator 156 may include a microprocessor designed to generate the PWM signal in accordance with the input load current and generate a shutdown signal in response to the load current exceeding a predetermined reference value.

The output voltage adjuster 158 may include a resistor R2 connected in series with the output dividing resistor R2 of the feedback circuit 140, and a switching element SW3 such as a MOSFET connected to the resistor R3. The output voltage adjuster 158 may change a reference feedback resistance of the feedback circuit 140. For example, in response to the transformer 110 outputting 18V at a PWM duty of 45%, the output of the transformer 110 may be changed into 12.8V at a PWM duty of 0%. The switching element SW3 may switch on/off in accordance with the PWM duty signals of the PWM signal generator 156. As the switching element SW3 is turned on/off, the resistor R3 is connected in parallel with the output dividing resistor R2 of the feedback circuit 140 or only the resistor R3 is connected. That is, the reference voltage Vref of the shunt regulator, for example, the output voltage of the transformer 110 applied to the resistor R2, to be compared with a direct current (DC) of 2.5V may be varied depending on switching on/off of the switching element SW3. In response to the load current of the audio system reaching a peak value exceeding a predetermined range, the PWM signal generator 156 generates the PWM signal and turns on the switching element SW3 of the output voltage adjuster 158, thereby connecting the resistor R3 with the resistor R2 in parallel. Thus, the voltage to be compared with the reference voltage Vref of the shunt regulator becomes lowered as the resistors R2 and R3 are connected in parallel, and the voltage applied to the photo-coupler of the feedback circuit 140 becomes lowered, so that the PWM signal supplier 130 can be controlled by the low output voltage of the photo-coupler, thereby finally lowering the output voltage of the transformer 110. At this time, the output voltage of the transformer 110 is restrictively lowered only when the load current exceeds a predetermined value, and therefore a user cannot substantially notice a change in an output characteristic of the audio system.

FIG. 6 is a circuit diagram of a power supply 200 according to another exemplary embodiment. For example, the power supply 200 of FIG. 6 employs an inductor-inductor-capacitor (LLC) resonance type transformer 210 in which zero-current switching/zero-voltage switching is possible. The power supply 200 may include the LLC resonance type transformer 210, a switching device 220, a PWM signal supplier 230, a feedback circuit 240, and an output voltage controller 250.

The LLC resonance transformer 210 transforms voltage applied to a primary winding wire to that for a secondary winding wire as the switching device 220 switches on/off, and performs LLC resonance through a resonance inductor Lr and a resonance capacitor Cr respectively connected to both sides of the primary winding wire L1. The secondary winding wire L2 of the LLC resonance transformer 210 may include a rectifier for rectifying and smoothing the output voltage.

In response to the primary winding-wire L1, the resonance inductor Lr and the resonance capacitor Cr included in the LLC resonance transformer 210 making LLC resonance and thus voltage is applied to the second switching transistor SW2, the second switching transistor SW2 is turned off and the electric current flows to the transformer 210 via the first switching transistor SW1 until the second switching transistor SW2 is turned on. That is, the LLC resonance occurs at the moment when the second switching transistor SW2 is turned on and in response to the second switching transistor SW2 being turned off.

The switching device 220 may include two, i.e., the first and second switching transistors SW1 and SW2 connected in series from the power terminal B+ to the ground.

The PWM signal supplier 230 supplies two switching signals which are different in phase to the first and second switching elements SW1 and SW2 of the switching device 220 and supplies an operating voltage VB to the LLC (inductor-inductor-capacitor) resonance transformer 210.

The feedback circuit 240 detects the output voltage supplied from the transformer 210 to the audio system, and regulates the output voltage of the transformer 210. As shown in FIG. 6, the feedback circuit 240 may include a shunt regulator, an output dividing resistor R2, and a photo-coupler. In response to the voltage applied to both ends of the output dividing resistor R2 being higher than the reference voltage Ref of the shunt regulator, the shunt regulator becomes conductive and thus an electric current flows in the primary side of the photo-coupler. As a result, a signal is transmitted to the secondary side of the photo-coupler, and electric current flows in the secondary side, thereby varying the switching duty of the PWM signal supplier 230.

The output voltage controller 250 detects the electric current of the load (audio system) and performs the PWM control for the feedback circuit 240, so that the output voltage of the transformer 210 can be controlled in accordance with the detected load current.

The output voltage controller 250 may include a shunt register 252 provided at an output side of the transformer 210, a current detector 254 detecting the electric current flowing in the shunt resistor 252, a PWM signal generator 256 receiving the detected current and generating the PWM signal, and an output voltage adjuster 258 varying the output voltage of the transformer in accordance with the PWM signal output from the PWM signal generator 256.

The shunt resistor 252 may be provided between the output side of the transformer 210 and the load (e.g., the audio system) in order to detect the load current. The shunt resistor may be connected to a high side as shown in FIG. 6. Although it is not shown, the shut resistor may be connected to a low side between a smoother ground and the secondary output of the transformer 110. If the shunt resistor 252 is connected to the low side, it is possible to use a relatively low resistor and thus reduce power consumption due to heat emission.

The current detector 254 can detect the load current, which flows in the shunt resistor 252, in real time. The current detector 254 outputs a voltage Vs to the PWM signal generator 256 in accordance with the detected load currents. The current detector 254 may be achieved by a packaged IC or a differential amplifier (e.g., an OP-AMP).

The PWM signal generator 256 outputs a PWM duty signal varied depending on the voltage Vs output from the current detector 254 and supplies it to the output voltage adjuster 258. For example, in response to the voltage Vs being equal to or lower than 2.5V, the PWM duty is maintained at 45%. On the other hand, in response to the voltage Vs being higher than 2.5V, the PWM duty is reduced. That is, in response to the voltage Vs increases from 2.5V to 4.0V, the PWM duty is reduced from 45% to 0%. At this time, the increase in the voltage Vs refers to the increase in the load current.

The PWM signal generator 256 may shut down the PWM signal supplier 230 in an overload case where the current flowing in the shunt resistor 252 is beyond a predetermined range. For example, in the state that the PWM duty is 0% and the transformer 210 outputs 12.8V, in response to the load current continuously increasing and reaching a limit value, the PWM signal generator 256 may output a fault signal. For example, to shut down the PWM signal supplier 230, a switching element (not shown) may be provided in a line supplying a voltage VB from the transformer 210 to the PWM signal supplier 230, and a fault signal for turning off the corresponding switching element may be applied. The PWM signal generator 256 may include a microprocessor designed to generate the PWM signal in accordance with the input load current and may generate a shutdown signal in response to the load current exceeding a predetermined reference value.

The output voltage adjuster 258 may include a resistor R2 connected in parallel with the output dividing resistor R2 of the feedback circuit 240, and a switching element SW3 such as a MOSFET connected to the resistor R3. The output voltage adjuster 258 may change a reference feedback resistance of the feedback circuit 240. For example, in response to the transformer 110 outputting 18V at a PWM duty of 45%, the output of the transformer 210 may be changed into 12.8V at a PWM duty of 0%. The switching element SW3 may switch on/off in accordance with the PWM duty signals of the PWM signal generator 256. As the switching element SW3 is turned on/off, the resistor R3 is connected in parallel with the output dividing resistor R2 of the feedback circuit 240 or only the resistor R3 is connected. That is, the reference voltage Vref of the shunt regulator, for example, the output voltage of the transformer 210 applied to the resistor R2, to be compared with a direct current (DC) of 2.5V may be varied depending on switching on/off of the switching element SW3. In response to the load current of the audio system reaching a peak value exceeding a predetermined range, the PWM signal generator 156 generates the PWM signal and turns on the switching element SW3 of the output voltage adjuster 258, thereby connecting the resistor R3 with the resistor R2 in parallel. Thus, the voltage to be compared with the reference voltage Vref of the shunt regulator becomes lowered as the resistors R2 and R3 are connected in parallel, and the voltage applied to the photo-coupler of the feedback circuit 240 becomes lowered, so that the PWM signal supplier 230 can be controlled by the low output voltage of the photo-coupler, thereby finally lowering the output voltage of the transformer 210. At this time, the output voltage of the transformer 210 is restrictively lowered only in response to the load current exceeding a predetermined value, and therefore a user cannot substantially notice a change in an output characteristic of the audio system.

In this exemplary embodiment, the power supply 100, 200 is a circuit that operates to properly supply the maximum peak power with respect to the peak music power output (PMPO), and prevent the power supply from overheating even when the peak output condition continues.

Figure 7:
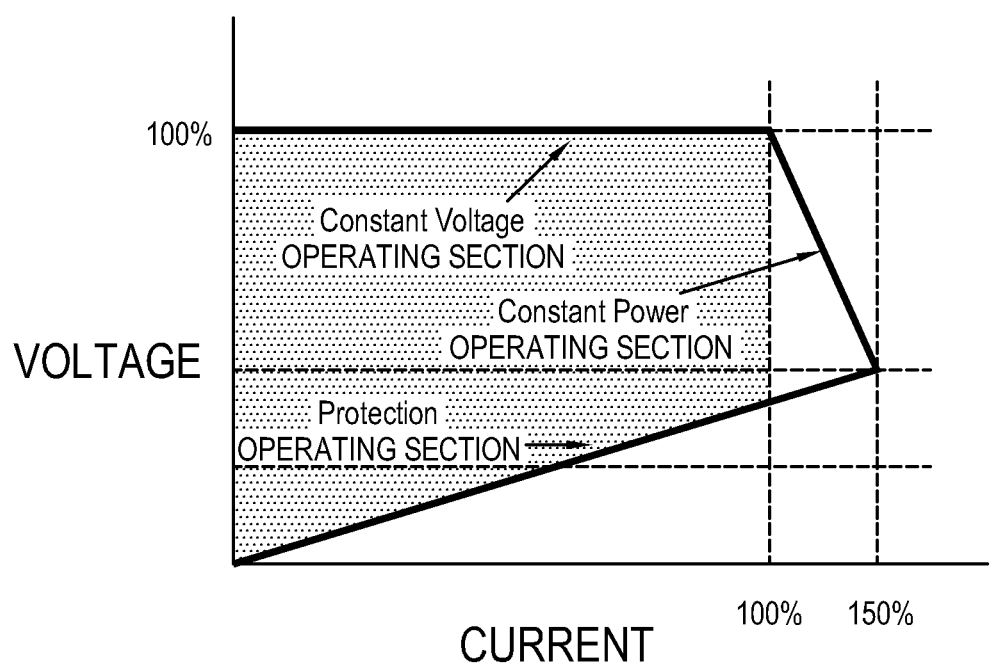
FIG. 7 is a view showing a relationship between a load current and an output voltage in the power supply according to an exemplary embodiment.

As shown in FIG. 7, in response to the audio load condition being normal, a constant voltage is output. On the other hand, in response to the peak output condition being continuously maintained or a current higher than the rated current is continuously increased, the output voltage controller 150, 250 is provided at the secondary side so that the output voltage can be gradually decreased while the constant current desired by the load is supplied, thereby supplying constant power. Also, the output voltage controller 150, 250 performs a protective operation under a preset overload condition, and thus shuts down the output.

Figure 8:
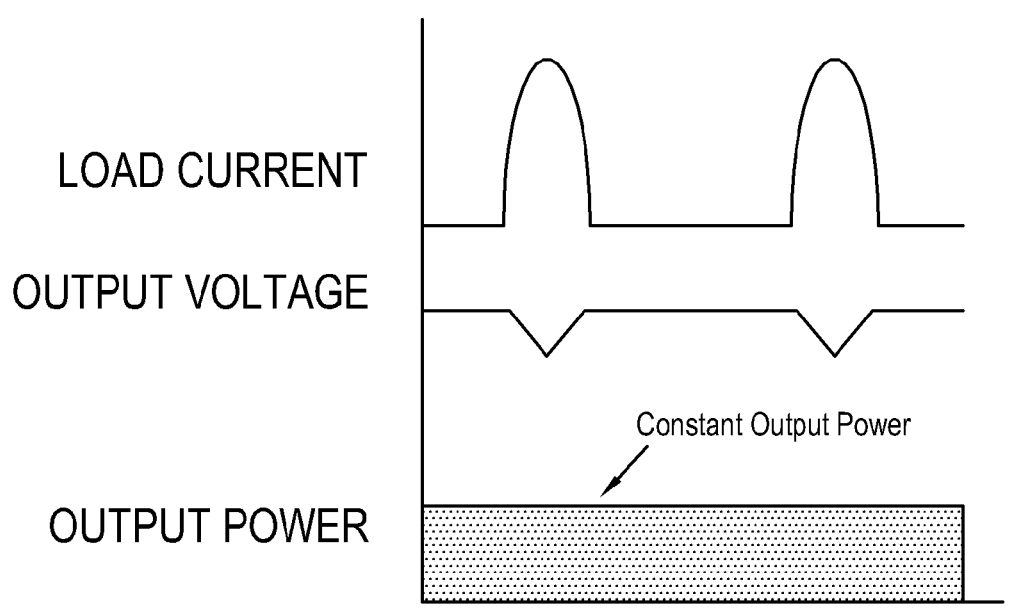
FIG. 8 is a view showing comparison between the voltage and power output from a transformer in accordance with the load current of the power supply according to an exemplary embodiment.

FIG. 8 is a view showing the output voltage and the output power in accordance with the load currents, in which the output voltage is properly changed as the load condition, is changed, thereby controlling the constant power to be output. As a result, in response to the load condition being changed, the output voltage is properly changed so that the constant power can be output, thereby preventing the power supply from overheating due to the peak output condition.

Figure 9:
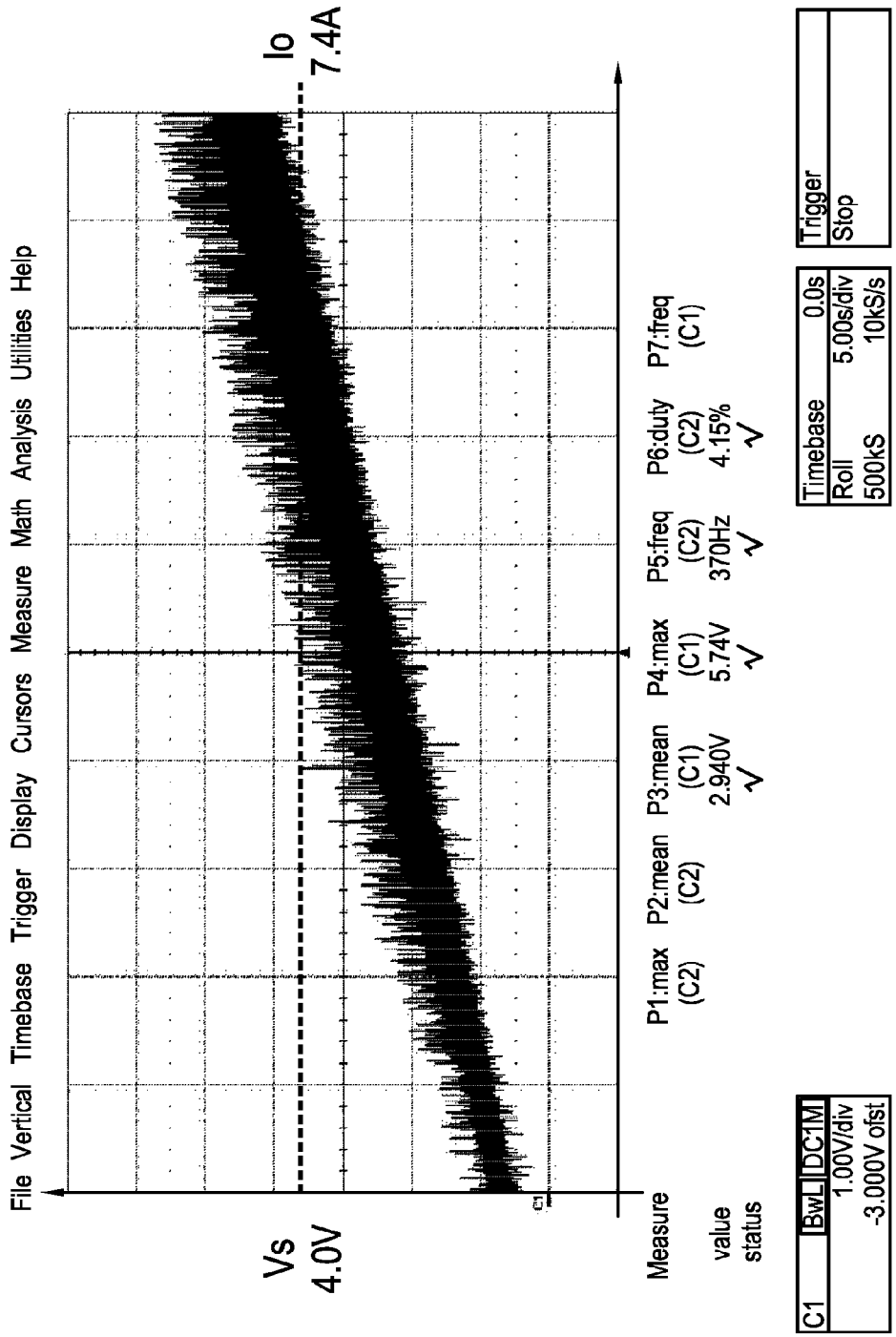
FIGS. 9 to 13 are views respectively showing a current detecting waveform, a PWM controlling waveform, and an output voltage waveform.

FIG. 9 shows a waveform resulting from monitoring the change in the load current by the current detector 152, 252 of the output voltage controller 150, 250.

Figure 10:
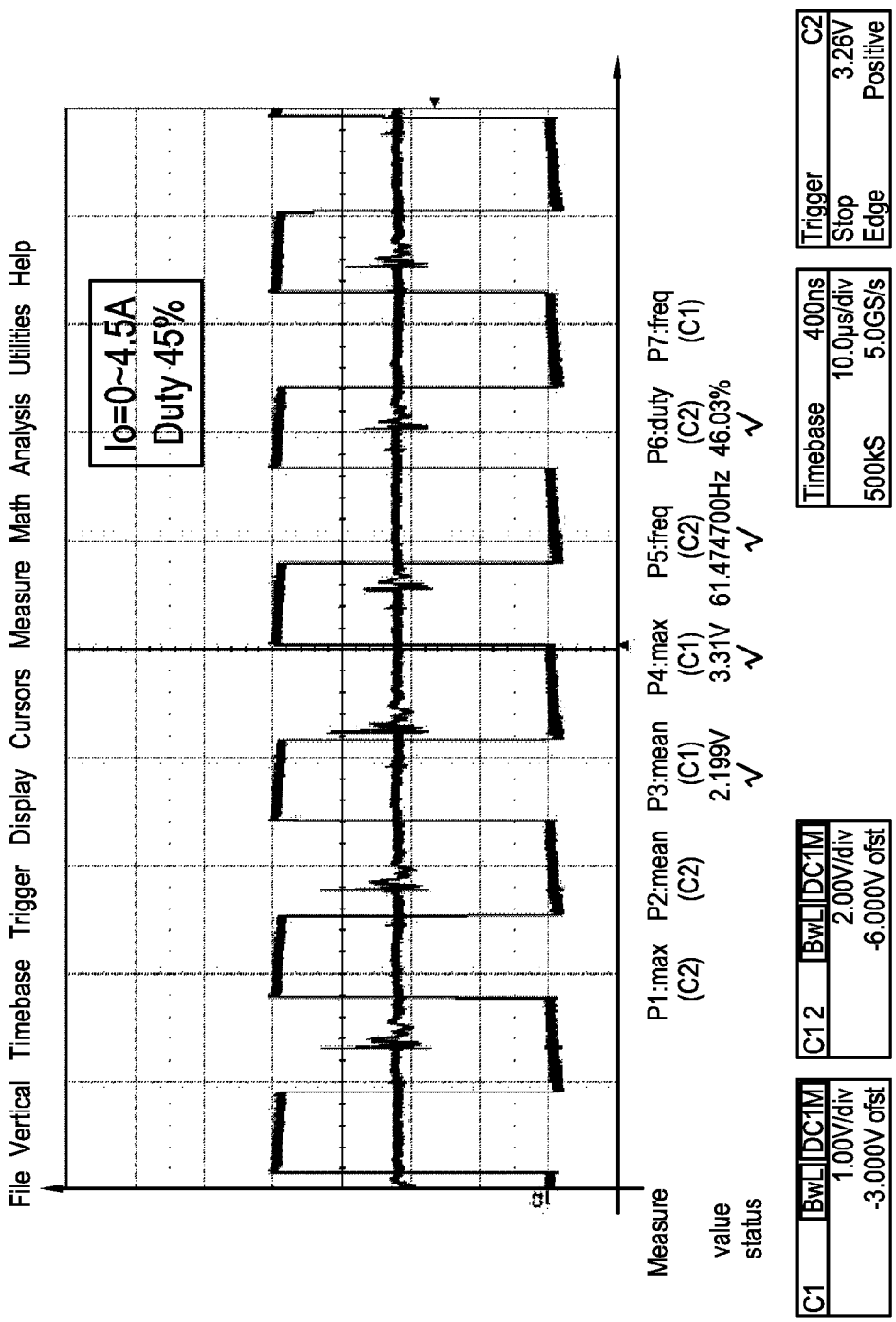
Figure 11:
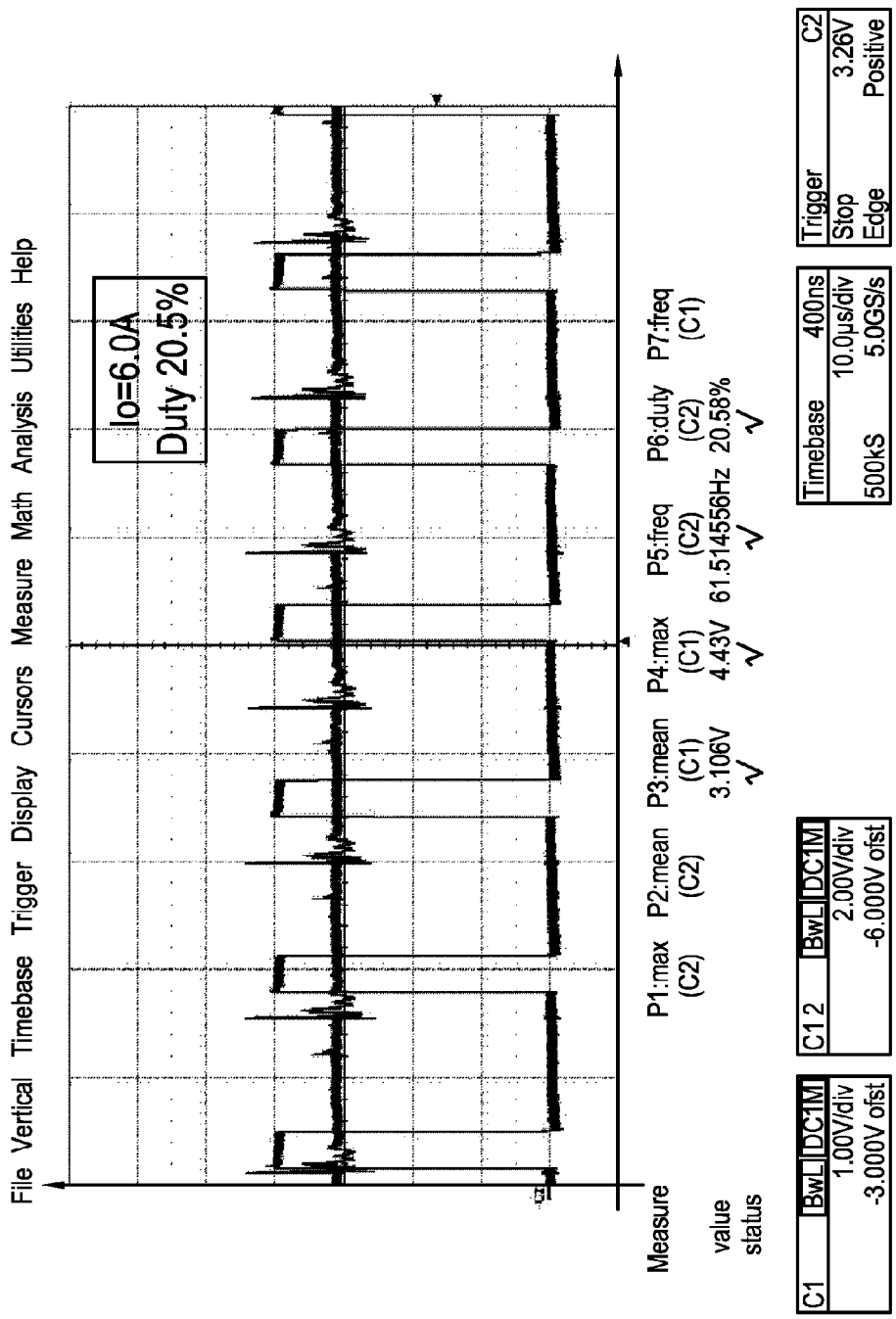
Figure 12:
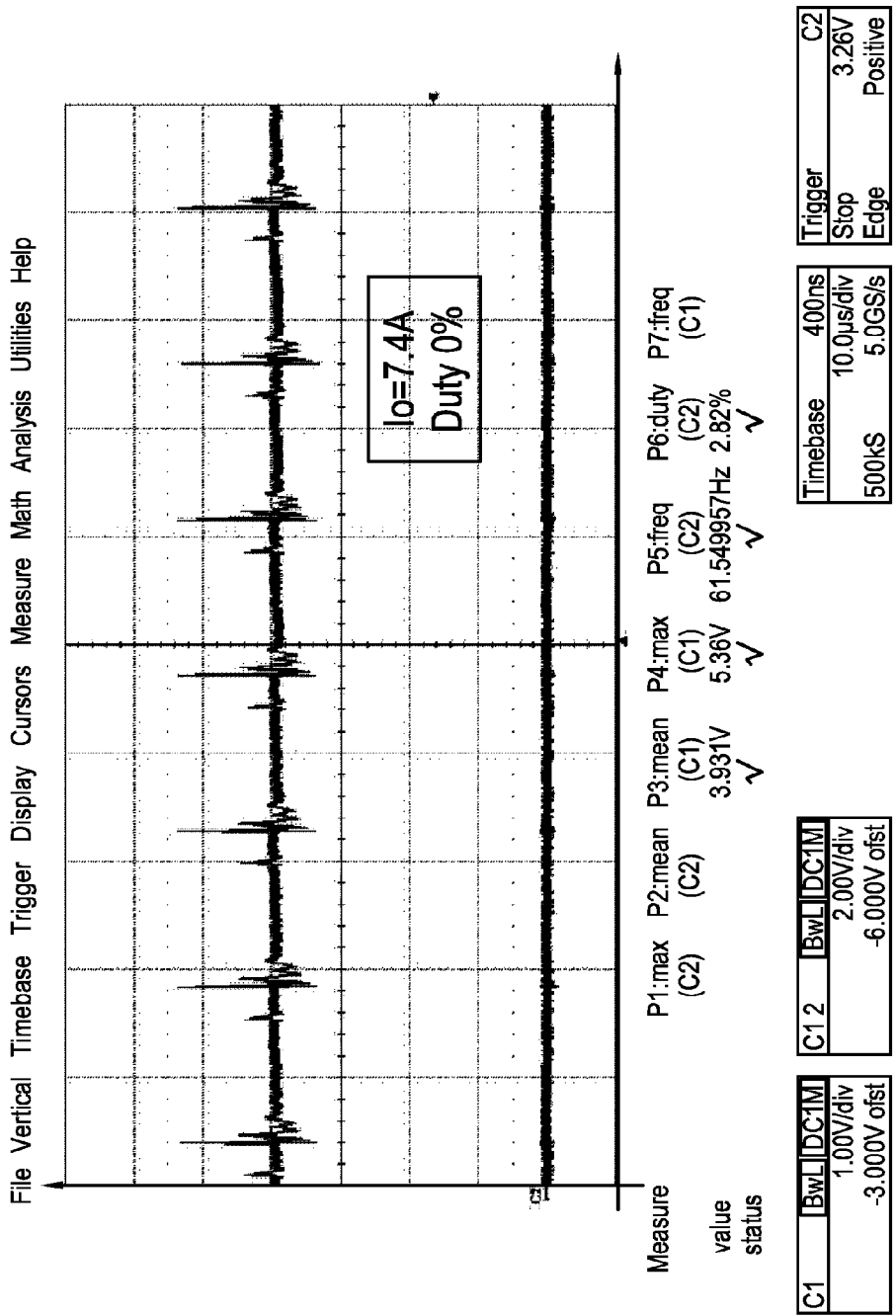

FIGS. 10 to 12 show the PWM duty signals output from the PWM signal generator 156, 256 as the load current is changed as shown in FIG. 9, in which the PWM signal generator 156, 256 may output the duty of 45% at the load current of 0-4.5 A, the duty of 20.5% at the load current of 6.0 A, and the duty of 0% at the load current of 7.4 A respectively.

Figure 13:
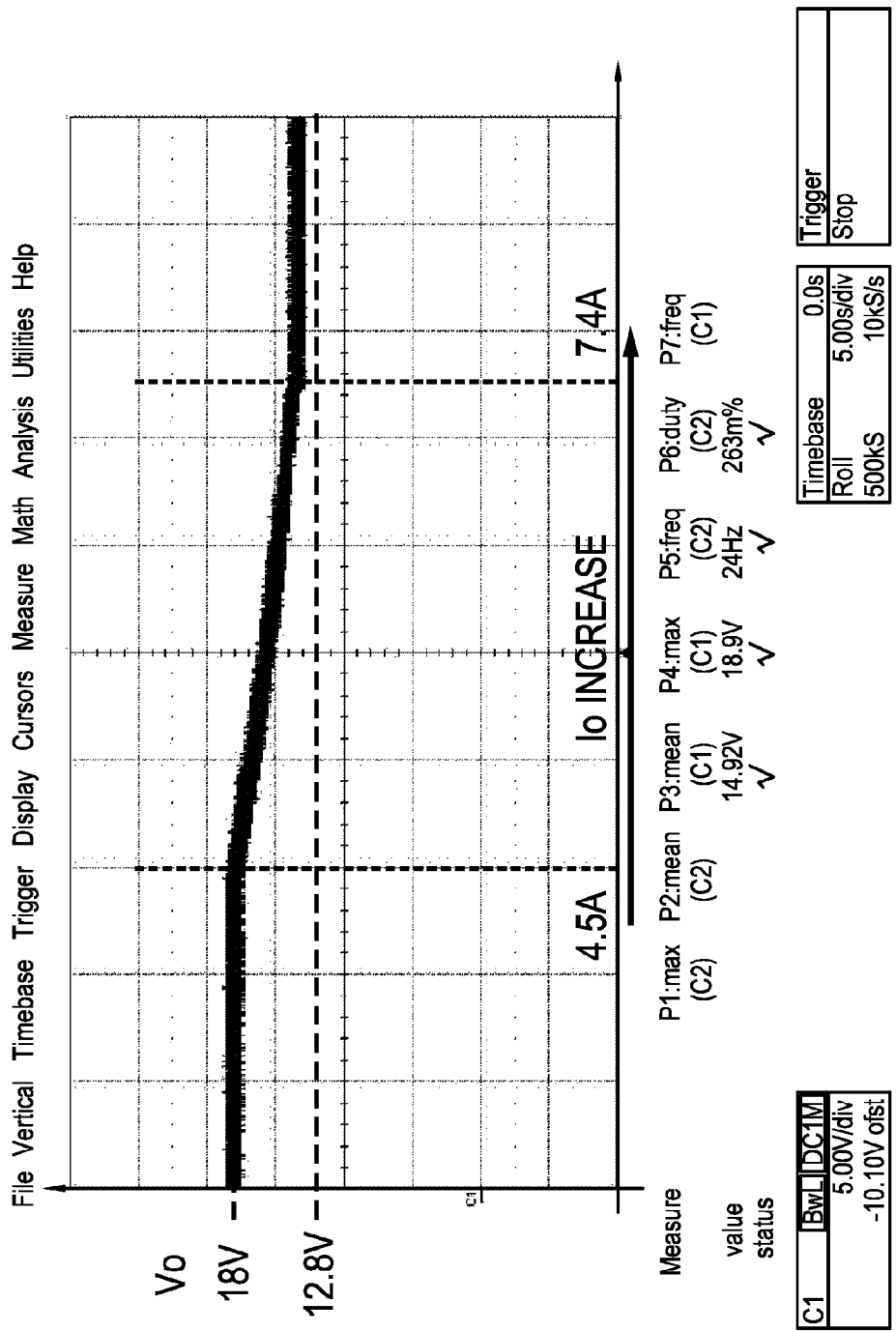

FIG. 13 shows a waveform of gradually decreasing the output voltage of the transformer 110, 210 as the voltage adjuster 158, 258 changes the reference resistance of the feedback circuit 140, 240 in accordance with the increase of the load current Io.

According to an exemplary embodiment, not only is maximum peak power properly supplied with regard to a peak music power output (PMPO) but also the power supply is prevented from overheating even when a peak output condition continues, thereby solving a problem of a defect resulting in product liability (PL).

According to an exemplary embodiment, a power supply solution optimized for high output device of which load is rapidly changed is secured, and the capacities of a transformer and an electrolytic capacitor can be reduced as compared with the existing capacities based on a rated design to thereby decrease the cost of materials.

Although a few exemplary embodiments have been shown and described, it will be appreciated by those skilled in the art that changes may be made in these exemplary embodiments without departing from the principles and spirit of the invention. Therefore, the foregoing has to be considered as illustrative only. The scope of the invention is defined in the appended claims and their equivalents. Accordingly, all suitable modification and equivalents may fall within the scope of the invention.

What is claimed is:

1. An apparatus for supplying power, the apparatus comprising:
    a transformer configured to output a predetermined voltage to a device varying in load;
    a switch configured to switch on and off the transformer in accordance with a first pulse width modulation (PWM) signals;
    a first PWM signal supplier configured to supply the first PWM signal to the switch;
    a feedback circuit configured to detect an output from the transformer and apply a control signal to the first PWM signal supplier; and
    an output voltage controller configured to detect a load current of the device, and adjust the control signal of the feedback circuit by adjusting the output detected by the feedback circuit in accordance with the detected load current,
    wherein the output voltage controller comprises:
    a shunt resistor configured to detect the load current;
    a current detector configured to detect a current flowing in the shunt resistor in order to detect the load current and output a predetermined voltage in accordance with the detected current;
    a second PWM signal generator configured to generate the second PWM signal in accordance with the predetermined voltage; and
    an output voltage adjuster configured to adjust the output detected by the feedback circuit in accordance with the second PWM signal output from the second PWM signal generator.

2. The apparatus according to claim 1, wherein the transformer comprises at least one of a flyback type, an LLC resonance type, a forward type, a push-pull type and a half bridge type.

3. The apparatus according to claim 1, wherein the shunt resistor is connected between a load and the output of the transformer in order to detect a high side current.

4. The apparatus according to claim 1, wherein the shunt resistor is connected between a ground (GND) and the output of the transformer in order to detect a low side current.

5. The apparatus according to claim 1, wherein the output voltage adjuster is configured to decrease an output voltage of the transformer as the load current increases.

6. The apparatus according to claim 1, wherein the current detector comprises a differential amplifier (OP-AMP).

7. The apparatus according to claim 1, wherein the second PWM signal generator generates a shut-down signal for shutting down the first PWM signal supplier in response to the load current exceeding a predetermined value.

8. The apparatus according to claim 1, wherein the feedback circuit comprises a shunt regulator and a first resistor connected in parallel between the ground and the output of the transformer, and
    the output voltage adjuster comprises a second resistor connected in series with the first resistor, and a second switch connected in series with the second resistor and switching on/off in accordance with the second PWM signal generated by the second PWM signal generator.

9. A method of supplying power, the method comprising:
    outputting a predetermined first voltage to a device varying in load, by switching on/off in accordance with a first pulse width modulation (PWM) signal;
    detecting a current flowing in a shunt resistor in order to detect the load current;
    outputting a predetermined second voltage in accordance with the detected current;
    generating a second PWM signal in accordance with the predetermined second voltage; and
    adjusting the first PWM signal in accordance with the second PWM signal, the second PWM signal being varied depending on a detected load current of the device.

10. The method according to claim 9, wherein the output of the predetermined voltage is performed by at least one of a flyback type, an LLC resonance type, a forward type, a push-pull type and a half bridge type.

11. The method according to claim 9, wherein the shunt resistor is connected between a load and the output of the transformer in order to detect a high side current.

12. The method according to claim 9, wherein the shunt resistor is connected between a ground (GND) and the output of the transformer in order to detect a low side current.

13. The method according to claim 9, wherein the adjustment of the output comprises decreasing the output voltage as the load current increases.

14. The method according to claim 9, wherein the detection of the load current is performed by a differential amplifier (OP-AMP).

15. The method according to claim 9, further comprising: shutting down a first PWM signal supplier in response to the load current exceeding a predetermined value.

16. An apparatus for supplying power to a device varying in load, the apparatus comprising:

a switch configured to switch on and off a voltage output in accordance with first pulse width modulation (PWM) signals;

a first PWM signal supplier configured to supply the first PWM signal to the switch;

a feedback circuit configured to apply a control signal to the first PWM signal supplier; and an output voltage controller configured to detect a load current of the device, and adjust the control signal of the feedback circuit in accordance with the detected load current, wherein the output voltage controller comprises:

a shunt resistor configured to detect the load current;

a current detector configured to detect a current flowing in the shunt resistor in order to detect the load current and output a predetermined voltage in accordance with the detected current;

a second PWM signal generator configured to generate the second PWM signal in accordance with the predetermined voltage; and an output voltage adjuster configured to adjust the output detected by the feedback circuit in accordance with the second PWM signal output from the second PWM generator.

* * * * *